United States Patent [19]

Janocha et al.

[11] 3,869,533

[45] Mar. 4, 1975

[54] PROCESS FOR THE MANUFACTURE OF MONOAXIALLY STRETCHED FILM STRIPS

[75] Inventors: Siegfried Janocha; Walter Seifried; Horst Gebler, all of Wiesbaden-Biebrich, Germany

[73] Assignee: Kalle Aktiengesellschaft Wiesbaden, Biebrich, Germany

[22] Filed: July 10, 1969

[21] Appl. No.: 840,857

[30] Foreign Application Priority Data

July 12, 1968 Germany.......................... 1779150

[52] U.S. Cl................. 264/146, 264/147, 264/154, 264/210 R, 264/288, 264/DIG. 47
[51] Int. Cl............................................. B29d 7/24
[58] Field of Search ........... 264/160, 154, 146, 147, 264/288, 210 R, 290

[56] References Cited
UNITED STATES PATENTS

| | | | |
|---|---|---|---|
| 3,233,029 | 2/1966 | Rasmussen.......................... | 264/288 |
| 3,398,220 | 8/1968 | Port et al............................ | 264/147 |
| 3,491,185 | 1/1970 | Rasmussen..................... | 264/147 |

FOREIGN PATENTS OR APPLICATIONS

| | | | |
|---|---|---|---|
| 801,971 | 9/1958 | Great Britain..................... | 264/288 |
| 682,937 | 3/1964 | Canada............................. | 264/288 |

*Primary Examiner*—Jeffery R. Thurlow
*Attorney, Agent, or Firm*—James E. Bryan

[57] ABSTRACT

This invention relates to a process for the manufacture of monoaxially stretched film strips from a film of a high-polymer thermoplastic synthetic material, in which process the film is longitudinally stretched in at least two stretching zones and is cut into strips between the two zones, the first zone being a relatively short stretching zone in the range of a few millimeters to the film thickness and the second stretching zone being a relatively long stretching zone in the range of the initial width of the film to several meters.

6 Claims, No Drawings

PROCESS FOR THE MANUFACTURE OF MONOAXIALLY STRETCHED FILM STRIPS

For the manufacture of fabrics and yarns there recently have been used monoaxially stretched film strips of thermoplastic high-polymers, the physical properties required thereof varying with the desired use. Film strips without, or with only a slight, tendency to splice are required for weaving purposes, but for use as a yarn, a pronounced tendency to splice, together with great tensile strength, are required.

The different requirements may be partially met by different longitudinal stretching ratios for monoaxial stretching the films or the film strips. It is known that, with an increase of the longitudinal stretching ratio, the tendency to splice and the tensile strength increase, but the tensile elongation decreases.

The manufacture of film strips generally is performed by extruding, longitudinally cutting, and longitudinally stretching a film. Londitudinal stretching is performed in one or more steps between two or more keyed roller systems running at different speeds of rotation, the film to be treated being heated to the necessary temperature prior to or during stretching by means of heat radiators, hot air or heated rollers.

For single-stage or multistage longitudinal stretching of films, two different processes are employed which differ primarily in the length of the stretching zone. It is known that the length of the stretching zone is an important factor for the change of the film dimensions by a stretching process. A long stretching zone, e.g., of the order of the film width, leads to a dimensional change, percentage width contraction and decrease of thickness of the film corresponding to one another. If, however, stretching is performed in a short zone which is only a fraction of the film width and only a few millimeters in length, stretching results almost completely from the thickness of the film. In this case, the film width is reduced only slightly or not at all.

When stretching identical original films, according to both stretching processes with long or short stretching zones, at the same longitudinal stretching ratios, different stretching speeds and effects of orientation are obtained in addition to different final dimensions. Since the achieved orientation determines the properties of the film, these latter are also very different.

Generally, stretching a film in one or more long stretching zones leads to a thicker film having an increased splicing tendency and a decreased tensile elongation, compared with a film stretched in one or more shorter stretching zones.

Further differences are to be found in the throughput during the manufacture of films of the same final thickness and in the achievable maximum stretching ratios. By stretching in a short stretching zone, i.e., in a narrow gap, it is possible, due to a considerable decrease of the thickness, to increase the throughput compared with stretching in a long stretching zone, i.e., in a wide gap. This possibility is limited in practice, however, by the achievable low stretching ratios and draw-off speeds.

When comparing the known stretching methods, it is apparent that the properties important for the practical value of the films, such as final dimensions, tensile strength, tensile elongation, and splicing tendency, are coupled with one another, in the case of a particular crude material, and are a function of the longitudinal stretching ratio and the length of the stretching zone.

The purpose of the present invention is to provide a variable process for the manufacture of monoaxially stretched film strips of a film of high-polymer thermoplastic synthetic material by longitudinal stretching and longitudinal cutting of the film, according to which it is possible to manufacture non-splicing as well as splicing film strips of definite final dimensions with a large throughput.

In accordance with the invention, this is achieved in that longitudinal stretching is performed in several stages in at least two stretching zones of different lengths. Stretching in a short stretching zone is performed first and longitudinal cutting into film strips is effected before longitudinal stretching in a long stretching zone. The longitudinal stretching preferably is carried out in two stages.

Surprisingly, it has been found that after-stretching, in a long stretching zone, of a synthetic plastic film pre-stretched in a short stretching zone involves an unexpectedly large effect on the changes in properties. The splicing tendency necessary for fibrillation or cutting into individual filaments can be achieved even in the case of a large stretching ratio in the narrow gap by after-stretching in the wide gap.

Monoaxially stretched film strips according to the invention can be manufactured from films of different thermoplastic synthetic high-polymers. Suitable are, for example, films of polyesters, such as polyethylene terephthalate, or of polyamides, such as polycondensation products from $\epsilon$-aminocapronic acid or hexamethylene diamine and adipic acid. Films of polyolefins or of the copolymers or polymer mixtures thereof are preferably used. Mixtures of polyolefins with other polymers having a polyolefin content of more than 60 per cent by weight also are suitable. It is thus possible to use mixtures of a polyolefin and polystyrene or of a polyolefin and a polyamide. Films of polypropylene have proved particularly suitable. Films of polyethylene of high density (low-pressure polyethylene) also are suitable for use in the process of the present invention.

In accordance with the invention, it is possible to use films having smooth surfaces as well as with embossed surfaces. The polymers also can be processed into film strips with the conventional additives, such as pigments, lubricants, stabilizers, and the like.

The stretching process proceeds in at least two stretching stages, the first stage being performed in a narrow gap and the second stage in a wide gap. Longitudinal stretching also can be performed in several stages, the subdivision of the stages being such that stretching is effected in several stages in the narrow gap as well as in several stages in the wide gap. It is important, however, that all longitudinal stretching in the narrow gap be effected before longitudinal stretching in the wide gap.

A narrow gap means a roller distance ranging from a few millimeters to the film thickness, whereas a wide gap means a distance of about the dimension of the film width up to several meters.

The wide gap must not be less than the initial film width, whereas there is no upper limit. The wide gap practically depends on the length of the heating zone which, at a given web speed, is required for completely heating the film. In the case of an initial film width of 1 meter, the usual gap widths range from 1.20 to 3.50 meters, for example.

Stretching is performed in ratios ranging from (2 to 6) : 1 in the narrow gap and in ratios ranging from (1.2 to 5) : 1 in the wide gap. The total stretching ratios are approximately in the range from (4 to 20) : 1. In the case of thicker basic film material, particularly in the case of polyolefin films, even greater stretching ratios may be employed.

By subdividing longitudinal stretching into different stretching stages in different stretching zones, with reference to the total stretching ratio, it is possible to control the splicing tendency. According to the process of the invention, film strips of high tensile strength, relatively high tensile elongation and low splicing tendency, as well as those of high tensile strength, high splicing tendency and low tensile elongation can be manufactured, for example.

Due to the decreased width contraction, the final width after the first stretching stage in the narrow gap is greater in all cases than the width achieved by stretching exclusively in a wide gap so that thicker films can be used for producing a definite final thickness.

Longitudinal cutting of the film is performed after stretching in the narrow gap and prior to the first stretching step in the wide gap. Cutting is performed in widths depending upon the final dimensions of the film strips desired for the end use and being in the range of about 5 to 40 mm, for example.

The invention will be further illustrated by the following examples, which relate to the use of polypropylene and copolymers and mixtures of polypropylene and polyethylene.

In the following examples, the standard gap width selected for the narrow gap was 2.5 mm and that selected for the wide gap 2.50 meters.

EXAMPLE 1

A polypropylene, as specified hereunder, extruded from a flat die is stretched over its entire width in a ratio of 4.5 : 1 in a narrow gap between rollers running at different speeds, the first roller being heated. The temperature of the heated roller is 120°C.

After the first stretching step, the film is cut into strips. Afterstretching is performed, in an air-heated zone at a temperature of 150°C., in a wide gap between two roller systems in a ratio of 2 : 1. Upon afterstretching, the dimensional changes are such that the percentage width contraction is equal to the percentage thickness decrease.

All one-stage stretching described for comparative purposes (see in the tables) was carried out in a wide gap of 2.50 meters in a heater at an air temperature of 150°C.

Table I shows the properties of the polypropylene strips manufactured with different subdivisions of the stretching ratios. They are compared in the final thicknesses, tensile strengths, and tensile elongations with strips stretched in one stage in the wide gap.

Measurements were carried out using an Instron tensile tester with a distance of 100 mm between the grips, and a feed which leads to an elongation of 100 percent/min. The films 1 to 4, 8, 9, and 12 were produced from a polypropylene having a melt index $i_5/230$ of 60 g/10 min. and the films 5 to 7, 10, and 11 from a polypropylene having a melt index $i_5/230$ of 9 g/10 min. (ASTM D 1238/57 T).

In Table I and in the other tables following later on, $\lambda_{tot.}$ means the ratio of the final length of the film to its initial length, and $\lambda_1$ and $\lambda_2$ the ratio of the corresponding lengths for the stretching stages concerned.

Table I

Comparison of polypropylene film strips stretched in one stage in a wide gap and in two stages at the same longitudinal stretching ratios

| Film Example | Basic film thickness μ | 1st Stretching, $\lambda_1$ | 2nd Stretching, $\lambda_2$ | Total stretching, $\lambda_{tot.}$ | Final thickness, μ | Tensile elongation, % | Tensile strength, kg/mm² |
|---|---|---|---|---|---|---|---|
| 1 | 80 | one-stage stretching | | 8 | 32 | 10 | 33 |
| | 80 | 3.5 | 2.3 | 8 | 19 | 16 | 39 |
| | 80 | 4 | 2 | 8 | 18 | 17 | 34 |
| | 80 | 5 | 1.6 | 8 | 16 | 22 | 36 |
| 2 | 80 | one-stage stretching | | 12 | 25 | 6 | 35 |
| | 80 | 3.5 | 3.4 | 12 | 16 | 8 | 44 |
| | 80 | 4 | 3 | 12 | 14 | 8 | 40 |
| | 80 | 5 | 2.4 | 12 | 13 | 10 | 41 |
| 3 | 65 | one-stage stretching | | 11.2 | 20 | 6 | 31 |
| | 65 | 3.6 | 3.1 | 11.2 | 15 | 11 | 41 |
| 4 | 130 | one-stage stretching | | 13.2 | 32 | 7 | 34 |
| | 130 | 4.1 | 3.2 | 13.2 | 22 | 9 | 50 |
| 5 | 180 | one-stage stretching | | 16.7 | 45 | 5 | 34 |
| | 180 | 4.2 | 4 | 16.7 | 32 | 6 | 42 |
| 6 | 210 | one-stage stretching | | 17 | 52 | 6 | 40 |
| | 210 | 4.1 | 4.1 | 17 | 32 | 6 | 45 |
| 7 | 250 | one-stage stretching | | 17.6 | 63 | 6 | 39 |
| | 250 | 3.9 | 4.5 | 17.6 | 39 | 7 | 47 |

The table shows that the film properties distinctly differ with identical longitudinal stretching ratios. Compared with stretching in the wide gap, two-stage stretching in the narrow and wide gaps leads to films with a smaller final thickness, greater tensile elongation and, surprisingly, also greater tensile strength. When varying the subdivision of the stretching stages, a systematic change of the properties can be observed. Considerable prestretching in the narrow gap results in the greatest tensile elongation whereas the smallest final thickness is obtained.

With a total stretching ratio of 8 : 1, no splicing tendency can be observed in the case of all samples stretched in two stages. But in the case of the sample stretched in one stage, the decreased strength in the transverse direction is noticeable under mechanical stress. The samples stretched in a ratio of 12 : 1 are all spliceable, but there can be observed a distinct change in the splicing tendency in dependence upon prestretching. Whereas at a prestretching ratio of 5 : 1, a medium splicing tendency is obtained, the high splicing tendency of single-stage stretching is nearly achieved at a prestretching ratio of 3.5 : 1. With greater total stretching ratios, the differences are indistinct.

Products with a differential splicing tendency are of great practical importance. No splicing tendency is desired, for example, for film strip fabrics for bags, whereas for basic carpet fabrics a proportioned splicing tendency is required for the penetration of the tufting needle. For the manufacture of yarn, however, the maximum splicing tendency is desirable.

EXAMPLE 2

A film from a mixture of polypropylene (as described on page 6) and 7 percent by weight of polyethylene (Lupolen, registered trade mark of Badische Anilin- & Soda-Fabrik, Ludwigshafen, Germany) was manufactured and stretched under the conditions of Example 1.

EXAMPLE 3

Example 2 was modified by using as the starting material a copolymer from polypropylene and 7 percent by weight of polyethylene.

EXAMPLE 4

The starting material used was pure polyethylene (Hostalen GF 5740 F, registered trade mark of Farbwerke Hoechst, Frankfurt-Hochst, Germany) and the working conditions were the same as those in Example 1, with the exception that the temperature was changed to 125°C for afterstretching or one-stage stretching.

The determined values are summarized in Table II, ratios being obtained which correspond to those obtained with pure polypropylene films.

Table II

Comparison of film strips made from mixtures or copolymers of polypropylene and polyethylene, stretched in one stage in a wide gap and in two stages at the same longitudinal stretching ratios

| Film | Basic film thickness, $\mu$ | 1st Stretching, $\lambda_1$ | 2nd Stretching, $\lambda_2$ | Total stretching, $\lambda_{tot}$ | Final thickness, $\mu$ | Tensile elongation, % | Tensile strength, kg/mm$^2$ |
|---|---|---|---|---|---|---|---|
| 1 | 80 | one-stage stretching | | 12 | 26 | 9 | 40 |
| Example 2 | 80 | 3.5 | 3.4 | 12 | 17 | 12 | 42 |
| | 80 | 5.0 | 2.4 | 12 | 13 | 15 | 43 |
| 2 | 65 | one-stage stretching | | 12 | 19 | 8 | 37 |
| Example 3 | 65 | 5.0 | 2.4 | 12 | 11 | 13 | 40 |
| 3 | 80 | one-stage stretching | | 8 | 31 | 28 | 27 |
| Example 4 | 80 | 4.0 | 2.0 | 8 | 15 | 39 | 30 |

The manufacture of films of comparable final thicknesses by means of single-stage stretching in the wide gap and two-stage stretching in the narrow gap and in the wide gap according to the invention can be achieved with films of the same thickness only by very great differences in longitudinal stretching. Considerable differences in the film properties are connected therewith (see Table III).

Table III

Comparison of the properties of polypropylene film strips stretched in one stage in the wide gap and in two stages and having comparable final thicknesses

| Film | Basic film thickness, $\mu$ | 1st Stretching, $\lambda_1$ | 2nd Stretching, $\lambda_2$ | Total stretching, $\lambda_{tot}$ | Final thickness, $\mu$ | Tensile elongation, % | Tensile strength, kg/mm$^2$ |
|---|---|---|---|---|---|---|---|
| 8 | 80 | one-stage stretching | | 19 | 19 | 4 | 38 |
| | 80 | 3.5 | 2 | 7 | 19 | 21 | 33 |
| | 80 | 4 | 1.75 | 7 | 18 | 25 | 31 |
| | 80 | 5 | 1.4 | 7 | 17 | 27 | 31 |

For achieving a certain final film thickness it is possible to use for two-stage stretching a thicker film than for single-stage stretching in the wide gap (see Table IV).

Table IV

Properties of monoaxially stretched strips manufactured from polypropylene films of different thicknesses by stretching in one stage and in two stages

| Film | Basic film thickness, $\mu$ | 1st Stretching, $\lambda_1$ | 2nd Stretching, $\lambda_2$ | Total stretching, $\lambda_{tot}$ | Final thickness, $\mu$ | Tensile elongation, % | Tensile strength, kg/mm$^2$ |
|---|---|---|---|---|---|---|---|
| 9 | 88 | one-stage stretching | | 9 | 30 | 12 | 46 |
| | 180 | 4.5 | 9 | 9 | 30 | 15 | 47 |
| 10 | 50 | one-stage | stretching | 17 | 12 | 5 | 37 |
| | 75 | 4 | 4 | 16 | 12 | 6 | 48 |
| 11 | 80 | one-stage | stretching | 14 | 20 | 5 | 47 |
| | 125 | 4 | 3.8 | 15 | 20 | 6 | 57 |
| 12 | 40 | one-stage | stretching | 13.5 | 11 | 5 | 32 |
| | 75 | 4 | 3.5 | 14 | 12 | 4 | 42 |

Due to the low width contraction and the considerable thickness decrease after the first stretching stage in the narrow gap, the output is greater than in the case of a single-stage process in a wide gap. In contradistinction to single-stage stretching in a narrow gap, there are no limitations on the running speed and in the maximum longitudinal stretching ratios since the stated stretching ratios of (2 to 6) : 1 are not yet in the critical range and are controllable. Draw-off speeds of 200 m/min can be achieved without difficulty. Therein resides a substantial advantage of the described two-stage process, in addition to the possibility of modifying the properties of the strips by varying the subdivision of the stretching stages.

It will be obvious to those skilled in the art that many modifications may be made within the scope of the present invention without departing from the spirit thereof, and the invention includes all such modifications.

What is claimed is:

1. A process for the manufacture of monoaxially stretched film strips from a film of a high-polymer thermoplastic synthetic material which comprises extruding a melt of the high-polymer material from a flat die to form a film, longitudinally stretching the film heated to an effective stretching temperature in a narrow gap in the range of a few millimeters to the film thickness, cutting the film longitudinally into strips, and longitudinally stretching the strips heated to an effective stretching temperature in a wide gap in the range of the initial width of the film to several meters.

2. A process according to claim 1 in which the second stretching is performed in two stages in stretching zones of different lengths.

3. A process according to claim 1 in which stretching is performed in the short stretching zone at a ratio $\lambda_1$ of (2 to 6) : 1 and in the long stretching zone at a ratio $\lambda_2$ of (1.2 to 5) : 1.

4. A process according to claim 1 in which the film is selected from the group consisting of a polyolefin, a copolymer thereof or a polymer mixture thereof.

5. A process according to claim 1 in which the film is high density polyethylene.

6. A process according to claim 1 in which the film is polypropylene.

* * * * *